United States Patent
Becker et al.

(10) Patent No.: US 11,456,805 B2
(45) Date of Patent: Sep. 27, 2022

(54) DUAL POLARIZATION UNIT FOR COHERENT TRANSCEIVER OR RECEIVER

(71) Applicant: Mellanox Technologies, Ltd., Yokneam (IL)

(72) Inventors: Don Becker, Beit Shemesh (IL); Dmitrios Kalavrouziotis, Papagou (GR); Paraskevas Bakopoulos, Ilion (GR); Vladimr Iakolev, Ecublens (CH); Elad Mentovich, Tel Aviv (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 17/438,143
(22) PCT Filed: May 8, 2019
(86) PCT No.: PCT/GR2019/000033
§ 371 (c)(1),
(2) Date: Sep. 10, 2021
(87) PCT Pub. No.: WO2020/225579
PCT Pub. Date: Nov. 12, 2020

(65) Prior Publication Data
US 2022/0190929 A1 Jun. 16, 2022

(51) Int. Cl.
*H04B 10/61* (2013.01)
*H04B 10/67* (2013.01)
*H04B 10/2569* (2013.01)
*H04B 10/60* (2013.01)
(Continued)

(52) U.S. Cl.
CPC ....... *H04B 10/614* (2013.01); *H04B 10/2569* (2013.01); *H04B 10/671* (2013.01);
(Continued)

(58) Field of Classification Search
None
See application file for complete search history.

(56) References Cited

U.S. PATENT DOCUMENTS 6,327,077 B1 * 12/2001 Okazaki .............. H01S 3/09415
398/79
6,483,620 B1 * 11/2002 Epworth ............ H04B 10/2569
398/154
(Continued)

FOREIGN PATENT DOCUMENTS

WO   WO 2009/105778 A1   8/2009
WO   WO 2016/042535 A1   3/2016

OTHER PUBLICATIONS

International Search Report and Written Opinion for International Application No. PCT/GR2019/000033, dated Jan. 23, 2020, 9 pages.
(Continued)

*Primary Examiner* — Darren E Wolf
(74) *Attorney, Agent, or Firm* — Alston & Bird LLP

(57) ABSTRACT

A passive dual polarization unit and coherent transceiver and/or receiver including one or more passive dual polarization units are provided. An example passive dual polarization unit includes a polarization splitter configured to split an input signal into a TE mode and TM mode signals; TE/TM splitters each designed to split the TE/TM mode signals into first TE/TM signals and second TE/TM signals; a first TE signal polarization rotation component for receiving the first TE signal and providing a third TM signal having the same magnitude and time dependence as the first TE signal; a first TM signal polarization rotation component for receiving the first TM signal and providing a third TE signal having the same magnitude and time dependence as the first TM signal; and TE/TM couplers that couple the second TE/TM signals and the third TE/TM signals to generate output TE/TM signals.

20 Claims, 2 Drawing Sheets

Figure 1:
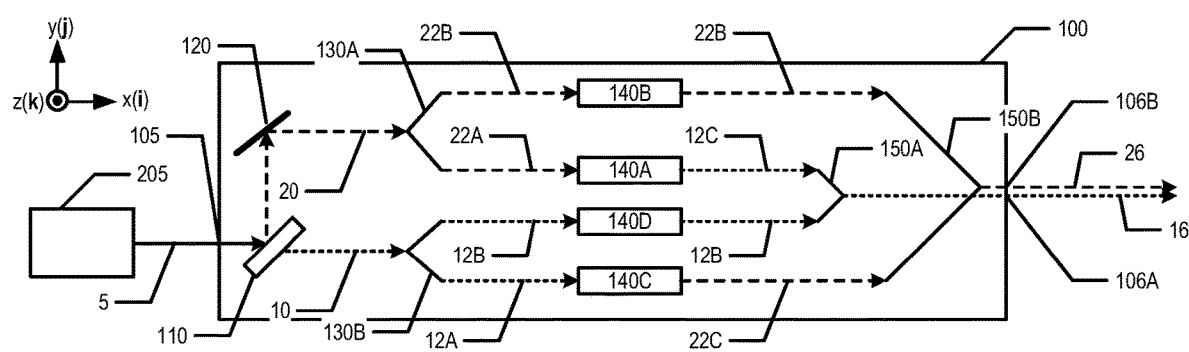

(51) Int. Cl.
    *H04B 10/43* (2013.01)
    *H04B 10/50* (2013.01)
    *H04B 10/40* (2013.01)

(52) U.S. Cl.
    CPC .............. *H04B 10/40* (2013.01); *H04B 10/43* (2013.01); *H04B 10/50* (2013.01); *H04B 10/60* (2013.01)

(56) References Cited

U.S. PATENT DOCUMENTS

| | | | |
|---|---|---|---|
| 2002/0109906 A1* | 8/2002 | Grubb | H04B 10/2935 359/334 |
| 2004/0202480 A1* | 10/2004 | Weid | G02B 6/274 398/147 |
| 2012/0008951 A1 | 1/2012 | Mikami | |
| 2016/0007105 A1 | 1/2016 | Jeong | |
| 2020/0153509 A1* | 5/2020 | Chen | H04B 10/1143 |

OTHER PUBLICATIONS

J. Wang et al., "Hybrid-Integrated Polarization Diverse Coherent Receiver Based on Polymer PLC," in IEEE Photonics Technology Letters, vol. 24, No. 19, pp. 1718-1721, Oct. 1, 2012. DOI: 10.1109/LPT.2012.2213299.

M. Baier et al., "Highly fabrication tolerant polarization converter for generic photonic integration technology," 2016 Compound Semiconductor Week (CSW) [Includes 28th International Conference on Indium Phosphide & Related Materials (IPRM) & 43rd International Symposium on Compound Semiconductors (ISCS), Toyama, 2016, pp. 1-2. DOI: 10,1109/ICIPRM.2016,7528537.

Thor Labs; "Polarizing Plate Beamsplitters"; Obtained from the Internet at: https://www.thorlabs.com/newgrouppage9.cfm?objectgroup_id=6004; 2 pages; downloaded Aug. 30, 2021.

Wesley D. Sacher, Tymon Barwicz, Benjamin J. F. Taylor, and Joyce K. S. Poon, "Polarization rotator-splitters in standard active silicon photonics platforms," Opt. Express 22, 3777-3786 (2014).

* cited by examiner

DUAL POLARIZATION UNIT FOR COHERENT TRANSCEIVER OR RECEIVER

CROSS-REFERENCE TO RELATED APPLICATIONS

This application is a national phase filing of International Application No. PCT/GR2019/000033, filed May 8, 2019, the content of which is hereby incorporated by reference in its entirety.

BACKGROUND

As data communication demands increase with respect to both volume and speed, fiber optics have become an increasingly popular communication approach. One method for further increasing the bandwidth of optical communications is the use of coherent optical communication. Coherent optical communication is characterized by coherent detection capabilities, which means that an optical transceiver or receiver can track the phase of an optical transmitter so as to extract any phase and frequency information carried by the transmitted signal. In particular, coherent optical communication enables the use of more complicated modulation formats on the signal compared to non-coherent optical communication. The use of more complicated modulation formats may increase the amount of data that may be transmitted along a pre-existing optical fiber. Therefore, there is a need for effective, energy-efficient coherent optical transceivers and/or receivers.

BRIEF SUMMARY

To perform effective coherent detection, two optical sources are generally mixed. For example, a data signal may be mixed with a local oscillator signal. For example, the local oscillator may be local to the transceiver and/or receiver, whereas the source of the data signal may be some distance away. However, the stable polarization states for both sources may be unstable and cause the transceiver and/or receiver to have unstable detection behavior. This problem is traditionally addressed through the use of post-receiver digital signal processing (DSP) to provide a correction feedback signal to the receiver for polarization state control or the use of dual-polarization optical modulators within the transmitter (e.g., within the signal source) to provide polarization control. These solutions require additional circuitry and increase the power consumption of the optical communication system.

To address these drawbacks, various embodiments are described herein that provide a passive dual polarization unit that may be used to provide stable polarization states. In various embodiments, an input signal is split into its transverse electric (TE) mode and transverse magnetic (TM) mode components. Each of the TE mode signal and the TM mode signal are split into two signals. For example, the TE mode signal is split into a first TE signal and a second TE signal. In another example, the TE mode signal is split into a first TM signal and a second TM signal. The first and second TE signals are approximately equal in amplitude and have the same time dependence. The first and second TM signals are also approximately equal in amplitude and have the same time dependence. The polarization of the second TE signal is rotated to generate a third TM signal and the polarization of the second TM signal is rotated to generate a third TE signal. The first and third TE signals are then combined to generate an output TE signal and the first and third TM signals are combined to generate an output TM signal. The output TE signal and the output TM signal are approximately equal in magnitude and have the same time dependence. The output signals may then be used for performing coherent detection with a stable polarization state.

Various embodiments provide a coherent optical transceiver and/or receiver comprising one or more dual polarization units. For example, if the coherent optical transceiver and/or receiver comprises a local oscillator and/or receives a signal from a local oscillator, the transceiver and/or receiver may comprise a dual polarization unit configured to condition the local oscillator signal for providing a TE local oscillator signal to a TE hybrid coupler and a TM local oscillator signal to a TM hybrid coupler, in an example embodiment. The TE local oscillator signal and the TM local oscillator signal may have stable polarization states. Similarly, the coherent optical transceiver and/or receiver may comprise a dual polarization unit configured to condition the received data signal for providing a TE data signal to a TE hybrid coupler and a TM data signal to a TM hybrid coupler, in an example embodiment. The TE data signal and the TM data signal may have stable polarization states.

According to an aspect of the present invention, a dual polarization unit is provided. In an example embodiment, the dual polarization unit includes a polarization splitter configured to split an input signal into a transverse electric (TE) mode signal and a transverse magnetic (TM) mode signal; a TE splitter configured to split the TE mode signal into a first TE signal and a second TE signal; a TM splitter configured to split the TM mode signal into a first TM signal and a second TM signal; a first TE signal polarization rotation component configured to receive the first TE signal and provide a third TM signal having the same amplitude and time dependence as the first TE signal; a first TM signal polarization rotation component configured to receive the first TM signal and provide a third TE signal having the same amplitude and time dependence as the first TM signal; a TE coupler configured to couple the second TE signal and the third TE signal to generate an output TE signal; and a TM coupler configured to couple the second TM signal and the third TM signal to generate an output TM signal.

According to another aspect of the present invention, a coherent transceiver and/or receiver is provided. In an example embodiment, the coherent transceiver or receiver includes a data signal dual polarization unit configured to receive a data signal and provide a TE data signal having TE polarization and a TM data signal having TM polarization, wherein the time-dependence and amplitude of the TE data signal is the same as the TM data signal; a local oscillator signal polarization unit configured to receive a local oscillator signal and provide a TE local oscillator signal having TE polarization and a TM local oscillator signal having TM polarization, wherein the time-dependence and amplitude of the TE local oscillator signal is the same as the TM local oscillator signal; a TE hybrid coupler configured to receive the TE data signal and the TE local oscillator signal and provide one or more TE coupled signals to one or more photodetectors of an array of photodetectors; and a TM hybrid coupler configured to receive the TM data signal and the TM local oscillator signal and provide one or more TM coupled signals to one or more photodetectors of an array of photodetectors. The array of photodetectors comprises a plurality of photodetectors, each photodetector of the plurality of photodetectors configured to receive one of the one or more TE coupled signals or TM coupled signals and provide an electric signal based on the received one of the one or more TE coupled signals or TM coupled signals. The data signal dual polarization unit includes a data polarization splitter configured to split an incoming signal into a data TE mode signal and a data TM mode signal; a data TE splitter configured to split the data TE mode signal into a first data TE signal and a second data TE signal; a data TM splitter configured to split the data TM mode signal into a first data TM signal and a second data TM signal; a first data TE signal polarization rotation component configured to receive the first data TE signal and provide a third data TM signal having the same amplitude and time dependence as the first data TE signal; a first data TM signal polarization rotation component configured to receive the first data TM signal and provide a third data TE signal having the same amplitude and time dependence as the first data TM signal; a data TE coupler configured to couple the second data TE signal and the third data TE signal to generate an output data TE signal; and a data TM coupler configured to couple the second data TM signal and the third data TM signal to generate an output data TM signal.

BRIEF DESCRIPTION OF THE SEVERAL VIEWS OF THE DRAWING(S)

Figure 2:
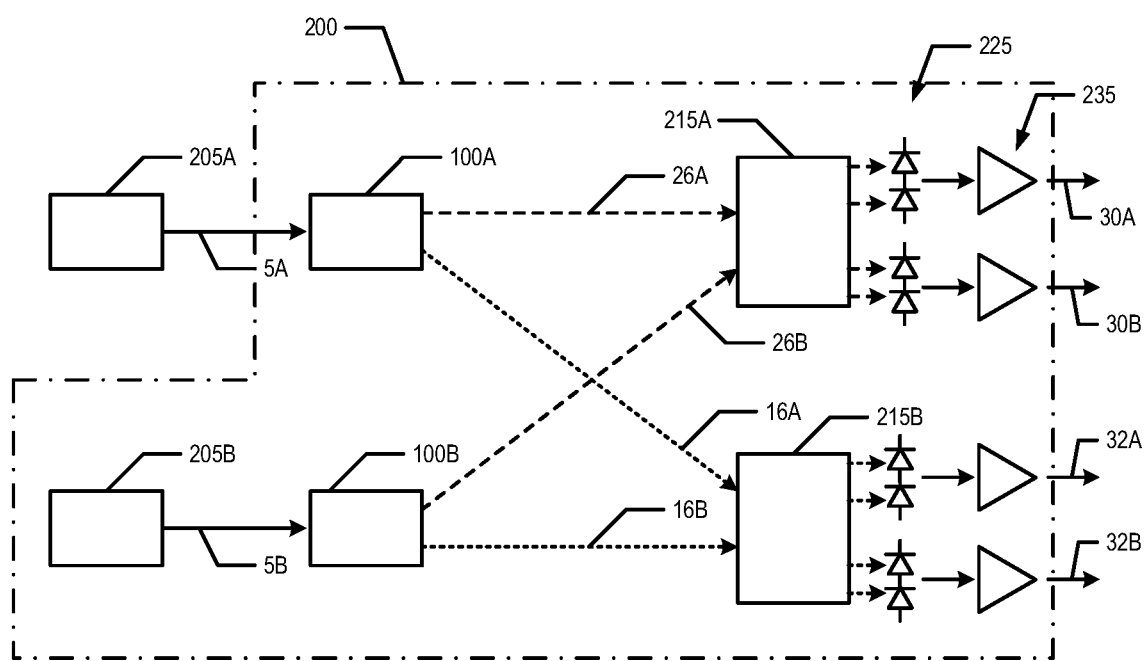

Having thus described the invention in general terms, reference will now be made to the accompanying drawings, which are not necessarily drawn to scale, and wherein:

FIG. 1 is an xy plane cross-section of a block diagram of a dual polarization unit, in accordance with an example embodiment; and FIG. 2 is a block diagram of a receiver or transceiver including one or more dual polarization units, in accordance with an example embodiment.

DETAILED DESCRIPTION OF THE INVENTION

Various embodiments now will be described more fully hereinafter with reference to the accompanying drawings, in which some, but not all embodiments are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. As used herein, the term "approximately" refers to tolerances within manufacturing and/or engineering standards.

Various embodiments provide a passive dual polarization unit configured to receive an input signal and provide two output signals with each output signal having a stable polarization. For example, the polarization of each of the output signals is time invariant. In an example embodiment, the two output signals have approximately equal amplitudes. Various embodiments provide a coherent optical transceiver and/or receiver comprising one or more passive dual polarization units.

Exemplary Dual Polarization Unit

FIG. 1 illustrates an example embodiment of a dual polarization unit 100. The dual polarization unit 100 is configured to receive an input signal 205 and provide a first output signal 16 and a second output signal 26. The first output signal 16 has a first polarization and the second output signal 26 has a second polarization. For example, in various embodiments, the first polarization is TE mode polarization and the second polarization is TM mode polarization. In the illustrated embodiment, the input signal is propagating in the x-direction (e.g., parallel to $\hat{i}$), a signal having TE polarization has an electric field in the y-direction (e.g., parallel to $\hat{j}$), and a signal having TM polarization has an electric field in the z-direction (e.g., parallel to $\hat{k}$).

In various embodiments, the input signal 5 enters the dual polarization unit 100 via the signal input 105. In an example embodiment, the signal input 105 may comprise an optical fiber and/or wave guide configured to provide an input signal 5 generated by a signal source 205. In various embodiments, the signal source 205 may be a data signal source or a local oscillator source.

In various embodiments, the input signal enters the dual polarization unit 100 and encounters a polarization splitter 110. In various embodiments, the input signal 5 comprises a TE polarization component having an amplitude of $f_E$ and a TM polarization component having an amplitude of $f_M$. In various embodiments, the polarization splitter 110 is configured to split the input signal 5 into a TE mode signal 10 having TE polarization and a TM mode signal 20 having a TM polarization. The TE mode signal 10 has an amplitude of approximately $f_E$ and the TM mode signal 20 has an amplitude of approximately $f_M$. For example, the polarization splitter may be configured to receive and/or have incident thereon the input signal 5 and provide as output the TE mode signal 10 and the TM mode signal 20.

In various embodiments, the polarization splitter 110 is an optical component made of silicon, glass, and/or the like. In various embodiments, the polarization splitter 110 may comprise one or more coatings, gratings, and/or the like configured to cause the decoupling of the TE mode signal 10 and the TM mode signal 20. In various embodiments, the polarization splitter 110 may be orientated at a specific orientation with respect to the signal input 105 such that the polarization splitter 110 causes the decoupling of the TE mode signal 10 and the TM mode signal 20. In an example embodiment, the polarization splitter 110 may be orientated at a specific orientation with respect to the signal input 105 such that the polarization splitter 110 causes the TE mode signal 10 to be provided along a first optical path and the TM mode signal 20 to be provided along a separate, second optical path. As should be understood, in various embodiments, the polarization splitter 110 may be configured to provide the TE mode signal 10 along the second optical path and the TM model signal 20 along the first optical path.

In an example embodiment, the first or second optical path may comprise one or more optical elements and/or components. In an example embodiment, the first optical path comprises mirror 120. For example, in the illustrated embodiment, the mirror 120 is used to cause the TE mode signal 10 to propagate parallel to the TM mode signal 20 (e.g., in the x-direction and/or parallel to $\hat{i}$). Various other optical elements and/or components may be included along the first and/or second optical path as appropriate for the application. In various embodiments, each of the optical elements and/or components along the first and/or second optical paths are passive. In various embodiments, the first and second optical paths are approximately the same length and/or have a length distance that is approximately a factor of the wavelength $\lambda$, of the input signal 5 such that the first polarization mode signal 10 and the second polarization mode signal 20 are at approximately the same phase when the two signals reach the beam splitters 130 (e.g., 130A, 130B).

The TE mode signal 10 may be received by a TE beam splitter 130A and split into a first TE signal 12A and a second TE signal 12B. For example, the TE beam splitter 130A may provide as output two approximately equivalent signals having TE polarization (e.g., the first and second TE signals 12A, 12B). In various embodiments, each of the first TE signal 12A and the second TE signal 12B have TE polarization and have an amplitude of approximately $f_E/2$. Similarly, the TM mode signal 20 may be received by a TM beam splitter 130B and split into a first TM signal 22A and a second TE signal 22B. For example, the TM beam splitter 130B may provide as output two approximately equivalent signals having TM polarization (e.g., the first and second TM signals 22A, 22B). In various embodiments, each of the first TM signal 22A and the second TM signal 22B have TM polarization and have an amplitude of approximately $f_M/2$. In various embodiments, the TE beam splitter 130A and the TM beam splitter 130B may be power divider couplers. In an example embodiment, the TE beam splitter 130A and the TM beam splitter 130B are 3 dB power divider couplers. In various embodiments the beam splitters 130A, 130B are passive components.

In various embodiments, the first TE signal 12A is incident on a first TE polarization rotation component 140A. In an example embodiment, the first TE polarization rotation component 140A is configured to rotate the polarization of the first TE signal 12A to generate, and provide as output, a third TM signal 22C. In an example embodiment, the first TE polarization rotation component 140A comprises one half-wave plate oriented at an angle of 45 degrees relative to the y-axis (where, as shown in FIG. 1, the y-axis is parallel to the electric field direction of the TE polarization). In various embodiments, the third TM signal 22C has an amplitude of approximately $f_E/2$ and TM polarization.

In various embodiments, the first TM signal 22A is incident on a first TM polarization rotation component 140C. In an example embodiment, the first TM polarization rotation component 140C is configured to rotate the polarization of the first TM signal 22A to generate, and provide as output, a third TE signal 12C. In an example embodiment, the first TM polarization rotation component 140C comprises three half-wave plates each oriented at an angle of 45 degrees relative to the y-axis (where, as shown in FIG. 1, the y-axis is parallel to the electric field direction of the TE polarization). In various embodiments, the third TE signal 12C has an amplitude of approximately $f_M/2$ and TE polarization.

In an example embodiment, each of the first and second TE and TM signals 12A, 12B, 22A, 22B is incident upon and/or received by a corresponding polarization rotation component 140A, 140B, 140C, 140D. In an example embodiment, the first TE polarization rotation component 140A comprises one half-wave plate orientated at 45 degrees relative to the y-axis (where, as shown in FIG. 1, the y-axis is parallel to the electric field direction of the TE polarization) and one or more (e.g., two) half-wave plates oriented at 0 degrees relative to the y-axis. For example, the first TE polarization rotation component 140A may be configured to adjust the phase and the polarization of the first TE signal 12A to generate a third TM signal 22C having an amplitude approximately equal to that of the first TE signal 12A (and the second TE signal 12B), that is approximately in-phase with the second TE signal 12B, the first TM signal 22A (and/or the third TE signal 12C) and the second TM signal 22B, and that has TM polarization. In an example embodiment, the second TE polarization rotation component 140B comprises one or more (e.g., three) half-wave plates oriented at 0 degrees relative to the y-axis. For example, the second TE polarization rotation component 140B may be configured to adjust the phase of the second TE signal 12B such that the phase of the second TE signal 12B remains approximately in-phase with the first TE signal 12A (and/or the third TM signal 22C), first TM signal 22A (and/or the third TE signal 12C), and the second TM signal 22B. In an example embodiment, the first TM polarization rotation component 140C comprises three half-wave plates orientated at 45 degrees relative to the y-axis. For example, the first TM polarization rotation component 140C may be configured to adjust the phase and the polarization of the first TM signal 22A to generate a third TE signal 12C having an amplitude approximately equal to that of the first TM signal 22A (and the second TM signal 22B), that is approximately in-phase with the first TE signal 12A (and/or the third TM signal 22C), the first TM signal 22A and the second TE signal 12B, and that has TE polarization. In an example embodiment, the second TM polarization rotation component 140D comprises one or more (e.g., three) half-wave plates oriented at 0 degrees relative to the y-axis. For example, the second TM polarization rotation component 140D may be configured to adjust the phase of the second TM signal 22B such that the phase of the second TM signal 22B remains approximately in phase with the first TE signal 12A (and/or the third TM signal 22C), the second TE signal 12B, and the first TM signal 22A (and/or the third TE signal 12C).

In various embodiments, the second TE signal 12A and the third TE signal 12C are provided as input to a TE beam coupler 150A. For example, the TE beam coupler 150A may receive the second TE signal 12B and the third TE signal 12C and couple the second TE signal 12B and the third TE signal 12C to generate a TE output signal 16. In various embodiments, the TE output signal 16 has an amplitude that is proportional to $f_E+f_M$ and has TE polarization. In an example embodiment, the TE output signal 16 has an amplitude of approximately $(f_E+f_M)/4$ and has TE polarization.

In various embodiments, the second TM signal 22B and the third TM signal 22C are provided as input to a TM beam coupler 150B. For example, the TM beam coupler 150B may receive the second TM signal 22B and the third TM signal 22C and couple the second TM signal 22B and the third TM signal 22C to generate a TM output signal 26. In various embodiments, the TM output signal 26 has an amplitude that is proportional to $f_E+f_M$ and has TM polarization. In an example embodiment, the TM output signal 26 has an amplitude of approximately $(f_E+f_M)/4$ and has TM polarization. For example, the TE output signal 16 and the TM output signal 26 may have approximately equal amplitudes. In various embodiments, the TE output signal 16 and the TM output signal 26 are both time-invariant and/or have the same time dependence. In various embodiments, the polarization of the TE output signal 16 and the TM output signal 26 are time invariant.

In various embodiments, the TE beam coupler 150A and the TM beam coupler 150B may be power divider couplers. In an example embodiment, the TE beam coupler 150A and the TM beam coupler 150B are 3 dB power divider couplers. In an example embodiment, the TE beam coupler 150A and the TM beam coupler 150B are passive components.

In various embodiments, the dual polarization unit 100 comprises a TE output 106A and a TM output 106B. In an example embodiment, each of the TE output 106A and the TM output 106B may comprise an optical fiber and/or wave guide configured to provide the corresponding one of the TE output signal 16 or the TM output signal 26.

In various embodiments, the dual polarization unit 100 may be incorporated into part of a photonic circuit. For example, the dual polarization unit 100 may be manufactured as an optical chip within a planar lightwave circuit (PLC).

Exemplary Coherent Transceiver and/or Receiver

In various embodiments, a coherent transceiver and/or receiver 200 may comprise one or more dual polarization units 100. FIG. 2 illustrates an example coherent receiver and/or receiver portion of a coherent transceiver. In various embodiments, the coherent transceiver and/or receiver 200 comprises a data polarization unit 100A configured to receive a data signal 5A and provide an output TE data signal 16A and an output TM data signal 26A. In various embodiments, the output TE data signal 16A and the output TM data signal 26A have approximately equal amplitudes and stable polarizations (e.g., TE polarization and TM polarization, respectively).

In an example embodiment, the data signal 5A is generated by a data signal generator 205A. For example, the data signal generator 205A may be a vertical cavity surface emitting laser (e.g., VCSEL) or other component configured to encode a data stream in an optical signal. In various embodiments, the data signal generator 205A may be a directly modulated signal source or an externally modulated signal source. In various embodiments, the data signal 5A may have a nominal wavelength of 850 nm, 1310 nm, and 1550 nm. Various other nominal wavelength data signals 5A may be used in various embodiments. In various embodiments, the data signal generator 205A is remotely located with respect to the coherent transceiver and/or receiver 200. For example, the data signal generator 205A may be coupled to the coherent transceiver and/or receiver 200 via an optical fiber and/or other waveguide. In an example embodiment, the data signal generator 205A may be at a distance of millimeters to kilometers from the coherent transceiver and/or receiver 200.

In various embodiments, the coherent transceiver and/or receiver 200 comprises a local oscillator polarization unit 100B configured to receive a local oscillator signal 5B and provide an output TE local oscillator signal 16B and an output TM local oscillator signal 26B. In various embodiments, the output TE local oscillator signal 16B and the output TM local oscillator signal 26B have approximately equal amplitudes and stable polarizations (e.g., TE polarization and TM polarization, respectively). In various embodiments, the local oscillator signal 5B is provided by a local oscillator 205B. In an example embodiment, the local oscillator 205B is part of the coherent transceiver and/or receiver 200.

In various embodiments, the coherent transceiver and/or receiver 200 further comprises a TE hybrid coupler 215B and a TM hybrid coupler 215A. For example, in various embodiments, a data dual polarization unit 100A may receive a data signal 5A (e.g., generated by data signal generator 205A) and provide as output an output TE data signal 16A that is provided to the TE hybrid coupler 215B and an output TM data signal 26A that is provided to the TM hybrid coupler 215A. In various embodiments, a local oscillator dual polarization unit 100B may receive a local oscillator signal 5B (e.g., generated by a local oscillator 205B) and provide as output an output TE local oscillator signal 16B that is provided to the TE hybrid coupler 215B and an output TM local oscillator signal 26B that is provided to the TM hybrid coupler 215A. In various embodiments, the TE hybrid coupler 215B and the TM hybrid coupler 215A are both 90 degree hybrid couplers.

In various embodiments, the TE hybrid coupler 215B and the TM hybrid coupler 215A are configured to provide combined signals to an array of photodetectors 225. For example, the array of photodetectors may comprise an array of balanced photodetectors. In an example embodiment, the balanced photodetectors may each comprise a pair of photodiodes. A photodetector of the array of photodetectors 225 is configured to receive an optical signal (e.g., generated by the TE hybrid coupler 215B or the TM hybrid coupler 215A) and generate an electric signal based on the detected optical signal. For example, the TE hybrid coupler 215B may couple the output TE data signal 16A and the output TE local oscillator signal 16B and provide one or more coupled TE signals to one or more photodetectors of the array of photodetectors 225. Similarly, the TM hybrid coupler 215A may couple the output TM data signal 26A and the output TM local oscillator signal 26B and provide one or more coupled TM signals to one or more photodetectors of the array of photodetectors. The photodetectors of the array of photodetectors 225 may then generate electrical signals based on the coupled TE or TM signal detected by the corresponding photodetector.

The electrical signals generated by the photodetectors of the array of photodetectors 225 may be provided to an array of amplifiers 235. In an example embodiment, the array of amplifiers 235 comprises a plurality of transimpedance amplifiers. For example, each amplifier of the array of amplifiers 235 may be configured to receive an electrical signal and provide an amplified electrical signal (e.g., 30A, 30B, 32A, 32B). The array of amplifiers 235 may then provide amplified output electrical signals 30A, 30B, 32A, and 32B. For example, the output electrical signal 30A may be an in-phase electrical signal generated based on the output TM data signal 26A and the output TM local oscillator signal 26B. For example, the output electrical signal 30B may be a quadrature electrical signal generated based on the output TM data signal 26A and the output TM local oscillator signal 26B. For example, the output electrical signal 32A may be an in-phase electrical signal generated based on the output TE data signal 16A and the output TE local oscillator signal 16B. For example, the output electrical signal 32B may be a quadrature electrical signal generated based on the output TE data signal 16A and the output TE local oscillator signal 16B. In various embodiments, the output electrical signals 30A, 30B, 32A, 32B may be provided to an analog-digital converter, a digital signal processing unit, and/or the like for processing of the data encoded in the data signal 5A.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A dual polarization unit comprising:
    a polarization splitter configured to split an input signal into a transverse electric (TE) mode signal and a transverse magnetic (TM) mode signal;
    a TE splitter configured to split the TE mode signal into a first TE signal and a second TE signal;
    a TM splitter configured to split the TM mode signal into a first TM signal and a second TM signal;
    a first TE signal polarization rotation component configured to receive the first TE signal and provide a third TM signal having the same amplitude and time dependence as the first TE signal;

a first TM signal polarization rotation component configured to receive the first TM signal and provide a third TE signal having the same amplitude and time dependence as the first TM signal;

a TE coupler configured to couple the second TE signal and the third TE signal to generate an output TE signal; and a TM coupler configured to couple the second TM signal and the third TM signal to generate an output TM signal.

2. The dual polarization unit of claim 1, wherein the unit is configured to receive the input signal and provide the output TE signal having TE mode polarization and the output TM signal having TM mode polarization.

3. The dual polarization unit of claim 1, wherein the output TE signal and the output TM signal are both time invariant signals.

4. The dual polarization unit of claim 1, wherein the output TE signal and the output TM signal have the same amplitudes.

5. The dual polarization unit of claim 1, wherein the first TE signal polarization rotation component comprises a half-wave plate orientated at 45 degrees relative to the y-axis, where the direction of the electric field of the TE mode signal is parallel to the y-axis, and the first TM signal polarization rotation component comprises three half-wave plates each oriented at 45 degrees relative to the y-axis.

6. The dual polarization unit of claim 1, further comprising a second TE signal polarization rotation component and a second TM signal polarization rotation component, wherein:

the first TE signal polarization rotation component comprises two half-wave plates each oriented at 0 degrees relative to the y-axis, where the direction of the electric field of the TE mode signal is parallel to the y-axis, and one half-wave plate oriented at 45 degrees relative to the y-axis, the second TE signal polarization rotation component comprises three half-wave plates each oriented at 0 degrees relative to the y-axis, the first TM signal polarization rotation component comprises three half-wave plates each oriented at 45 degrees relative to the y-axis, and the second TM signal polarization rotation component comprises three half-wave plates each oriented at 0 degrees relative to the y-axis.

7. The dual polarization unit of claim 1, wherein the TE splitter and the TM splitter are each 3 dB power divider couplers.

8. The dual polarization unit of claim 1, wherein the TE coupler and the TM coupler are each 3 dB power divider couplers.

9. The dual polarization unit of claim 1, wherein (a) the input signal comprises the TE mode signal of amplitude $f_E$ and the TM mode signal of amplitude $f_M$, (b) the output TE signal has an amplitude of $f_E/4+f_M/4$, and (c) the output TM signal has an amplitude of $f_E/4+f_M/4$.

10. The dual polarization unit of claim 1, wherein each component of the dual polarization unit is a passive component.

11. The dual polarization unit of claim 1, wherein the dual polarization unit is manufactured as an optical chip within a planar lightwave circuit.

12. A coherent transceiver or receiver comprising:

a data signal dual polarization unit configured to receive a data signal and provide a transverse electric (TE) data signal having TE polarization and a transverse magnetic (TM) data signal having TM polarization, wherein the time-dependence and amplitude of the TE data signal is the same as the TM data signal;

a local oscillator signal polarization unit configured to receive a local oscillator signal and provide a TE local oscillator signal having TE polarization and a TM local oscillator signal having TM polarization, wherein the time-dependence and amplitude of the TE local oscillator signal is the same as the TM local oscillator signal;

a TE hybrid coupler configured to receive the TE data signal and the TE local oscillator signal and provide one or more TE coupled signals to one or more photodetectors of an array of photodetectors; and a TM hybrid coupler configured to receive the TM data signal and the TM local oscillator signal and provide one or more TM coupled signals to one or more photodetectors of the array of photodetectors, wherein the array of photodetectors comprises a plurality of photodetectors, each photodetector of the plurality of photodetectors configured to receive one of the one or more TE coupled signals or TM coupled signals and provide an electric signal based on the received one of the one or more TE coupled signals or TM coupled signals, and wherein the data signal dual polarization unit comprises:

a data polarization splitter configured to split an incoming signal into a data TE mode signal and a data TM mode signal;

a data TE splitter configured to split the data TE mode signal into a first data TE signal and a second data TE signal;

a data TM splitter configured to split the data TM mode signal into a first data TM signal and a second data TM signal;

a first data TE signal polarization rotation component configured to receive the first data TE signal and provide a third data TM signal having the same amplitude and time dependence as the first data TE signal;

a first data TM signal polarization rotation component configured to receive the first data TM signal and provide a third data TE signal having the same amplitude and time dependence as the first data TM signal;

a data TE coupler configured to couple the second data TE signal and the third data TE signal to generate an output data TE signal; and a data TM coupler configured to couple the second data TM signal and the third data TM signal to generate an output data TM signal.

13. The coherent transceiver or receiver of claim 12, wherein the local oscillator signal dual polarization unit comprises:

a local oscillator polarization splitter configured to split an incoming signal into a local oscillator TE mode signal and a local oscillator TM mode signal;

a local oscillator TE splitter configured to split the local oscillator TE mode signal into a first local oscillator TE signal and a second local oscillator TE signal;

a local oscillator TM splitter configured to split the local oscillator TM mode signal into a first local oscillator TM signal and a second local oscillator TM signal;

a first local oscillator TE signal polarization rotation component configured to receive the first local oscillator TE signal and provide a third local oscillator TM signal having the same amplitude and time dependence as the first local oscillator TE signal;

a first local oscillator TM signal polarization rotation component configured to receive the first local oscillator TM signal and provide a third local oscillator TE signal having the same amplitude and time dependence as the first local oscillator TM signal;

a local oscillator TE coupler configured to couple the second local oscillator TE signal and the third local oscillator TE signal to generate an output local oscillator TE signal; and a local oscillator TM coupler configured to couple the second local oscillator TM signal and the third local oscillator TM signal to generate an output local oscillator TM signal.

14. The coherent transceiver or receiver of claim 12, further comprising an array of transimpedance amplifiers, each transimpedance amplifier of the array of transimpedance amplifiers configured to receive the electric signal generated by at least one photodetector of the photodetector array and provide an amplified electrical signal.

15. The coherent transceiver or receiver of claim 12, wherein each photodetector of the photodetector array is a balanced photodetector.

16. The coherent transceiver or receiver of claim 15, wherein each photodetector of the photodetector array comprises a pair of photodiodes.

17. The coherent transceiver or receiver of claim 12, wherein the TE hybrid coupler is a 90 degree hybrid coupler and the TM hybrid coupler is a 90 degree hybrid coupler.

18. The coherent transceiver or receiver of claim 12, further comprising a local oscillator configured to provide the local oscillator signal.

19. The coherent transceiver or receiver of claim 12, wherein the data signal is generated by a directly modulated signal source.

20. The coherent transceiver or receiver of claim 12, wherein the data signal is generated by an externally modulated signal source.

* * * * *